Jan. 5, 1932. O. SELLING 1,839,998
CURLING TONGS
Filed April 19, 1929
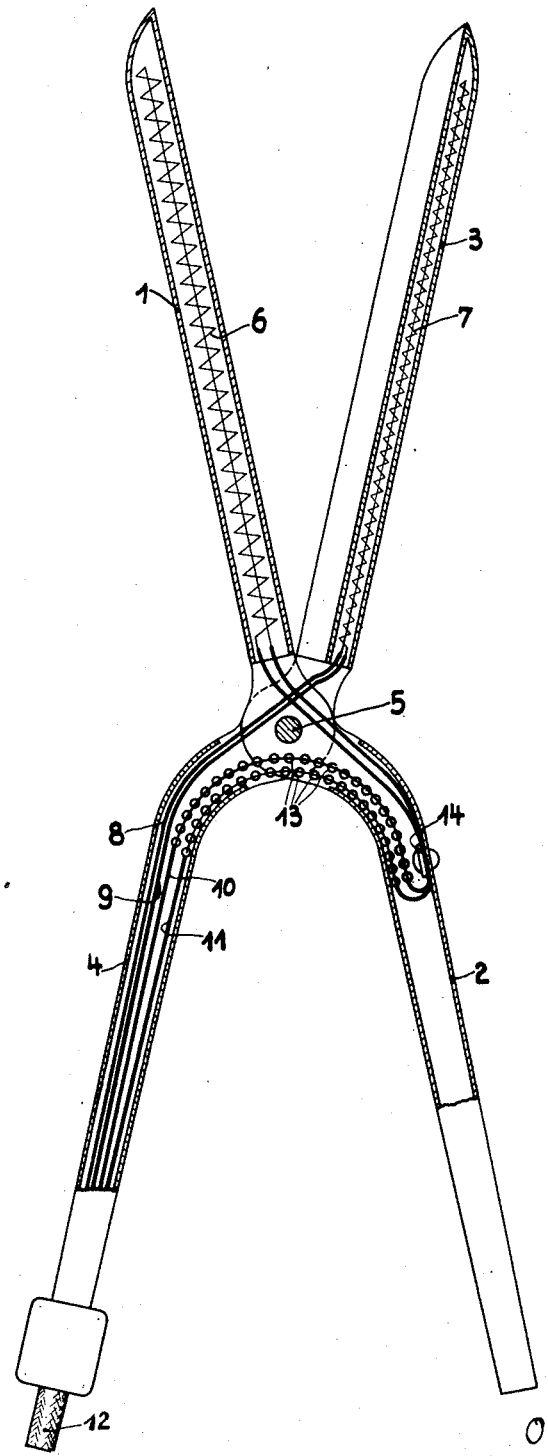

Patented Jan. 5, 1932

1,839,998

UNITED STATES PATENT OFFICE

OTTO SELLING, OF STUTTGART, GERMANY, ASSIGNOR TO ROBERT BOSCH AKTIEN-GESELLSCHAFT, OF STUTTGART, GERMANY

CURLING TONGS

Application filed April 19, 1929, Serial No. 356,430, and in Germany January 12, 1929.

The present invention relates to electrically heated curling tongs.

In electrically heated curling tongs which have heating resistances constructed in both arms of the tongs it is necessary to arrange the supply leads to the two heating resistances in one handle of the tongs and to distribute them at the point of articulation to the two heating arms. The lead from this handle into its corresponding heating arm remains unaffected on relative angular displacement of the tongs but the lead from the said handle to the other heating arm is however subjected to a bending strain.

In order to keep this strain as small as possible the lead from the one handle to the arm corresponding to the other handle of the tongs is according to the invention led first in the form of a curve into the upper portion of the said other handle and from there into the corresponding heating arm.

One form of construction of the invention is shown partly in section in the accompanying drawing.

The curling tongs which are shown in the drawing consist of a hollow heating arm 1 with a hollow handle 2, and a hollow channeled heating arm 3 with a hollow handle 4. The two elements of the tongs are pivotally connected together by a bolt 5.

Heating resistances 6 and 7 suitably insulated from the heating arms are mounted in the heating arms 1 and 3 respectively. Two pairs of conductors 8, 9, 10, 11 which may be connected to a source of current in usual manner by means of the cable 12 are led through the handle 4. The two conductors 8 and 9 are covered over their whole length with insulating tubing and are connected with the two ends of the heating resistance 7. They are completely located in the element 3, 4 of the tongs and are fixed relatively thereto.

The conductors 10 and 11 are only covered with insulating tubing up to the top end of the handle 4 and are then led in the form of an arc below the bolt 5 into the upper end of the handle 3 and are insulated by beads 13. The conductors 10 and 11 are then led into the arm 1 of the tongs above the bolt 5 to the two ends of the heating resistance 6, being again covered by insulating tubing. The two leads 10 and 11 are held in the upper end of the handle 2 by means of the plate 14 riveted to the latter.

On relative angular movement of the arms of the tongs only the curved portions of the conductors 10 and 11 bend. As the arc formed thereby is comparatively great the conductors are only slightly bent so that they cannot break even when the tongs have been in use for a long period.

I claim:

1. Electrically heated curling tongs comprising two handles and two arms each handle being formed integral with an arm, pivotal connecting means for said handles and arms, electrical heating means within each of said arms, a pair of conductors within one handle and extending into the corresponding arm formed integral with said handle, a second pair of conductors within said handle extending into the other handle along an arc of large radius to a point removed from said pivotal means and from thence into the arm corresponding to said other handle.

2. Electrically heated curling tongs comprising a pair of hollow tong elements each of which is formed of a handle and an arm, pivotal means connecting said elements intermediate of their ends, electrical heating means within the arms of said elements, a pair of conductors within the handle of one element and extending into the arm of said element, a second pair of conductors within the handle of said element extending into the handle of the second element along an arc of large radius to a point removed from said pivotal means and from thence into the arm of said second element.

3. Electrically heated curling tongs comprising a pair of hollow tong elements each of which is formed of a handle and an arm, pivotal means connecting said elements intermediate of their ends, electrical heating means within the arms of said elements, a pair of conductors within the handle of one element and extending into the arm of said element, a second pair of conductors formed of a pair of substantially straight portions within the handle of the first mentioned element, a pair of arcuate portions extending from the handle of the first mentioned element to the handle of the second element along an arc of large radius to a point removed from said pivotal means and a pair of substantially straight portions extending from said point in the handle of said second element into the arm thereof.

4. Electrically heated curling tongs comprising a pair of hollow tong elements each of which is formed of a handle and an arm, pivotal means connecting said elements intermediate of their ends, electrical heating means within the arms of said elements, a pair of conductors within the handle of one element and extending into the arm of said element, insulating coverings on said conductors, a second pair of conductors, formed of a pair of substantially straight portions within the handle of the first mentioned element, a pair of arcuate portions extending from the handle of the first mentioned element to the handle of the second element along an arc of large radius to a point removed from said pivotal means, a pair of substantially straight portions extending from said point in the handle of said second element into the arm thereof, insulating coverings on said two pairs of straight portions and spaced insulating beads on said arcuate portions.

5. Electrically heated curling tongs comprising a pair of hollow tong elements each of which formed of a handle and an arm, pivotal means connecting said elements intermediate of their ends, electrical heating means within the arms of said elements, a pair of conductors within the handle of one element and extending into the arm of said element, a second pair of conductors formed of a pair of substantially straight portions within the handle of the first mentioned element, a pair of arcuate portions extending from the handle of the first mentioned element to the handle of the second element along an arc of large radius to a point removed from said pivotal means, a pair of substantially straight portions extending from said point in the handle of said second element into the arm thereof and means within the handle of said second element for securing the said straight portions within said element to the wall thereof.

6. Electrically heated curling tongs comprising a pair of hollow tong elements each of which is formed of a handle and an arm, pivotal means connecting said elements intermediate of their ends, electrical heating means within the arms of said elements, a pair of conductors within the handle of one element and extending above said pivoting means into the arm of said element, a second pair of conductors within the handle of said element extending beneath said pivoting means into the handle of the second element along an arc of large radius to a point removed from said pivotal means and from thence above said pivoting means into the arm of said second element.

7. Electrically heated curling tongs comprising a pair of hollow tong elements, each of which is formed of a handle and an arm, pivotal means for connecting said elements intermediate of their ends, electrical heating means within the arms of said elements, conductors to the said heating means passing through the handle of one element, a part of said conductors extending into the handle of the second element along an arc of large radius to a point removed from said pivotal means and from thence into the arm of said second element.

8. Electrically heated curling tongs according to claim 7, which also comprise means within the handle of said second element for securing the conductors extending into this handle to the wall thereof.

In testimony whereof I have hereunto affixed my signature.

OTTO SELLING.